United States Patent [19]
Albani

[11] 3,858,290
[45] Jan. 7, 1975

[54] METHOD OF MAKING INSERTS FOR COOLED TURBINE BLADES

[75] Inventor: Peter E. Albani, Hamden, Conn.

[73] Assignee: Avco Corporation, Stratford, Conn.

[22] Filed: Nov. 21, 1972

[21] Appl. No.: 308,513

[52] U.S. Cl............ 29/156.8 H, 29/156.8 T, 416/96
[51] Int. Cl.......................... B23p 15/02, B21k 3/04
[58] Field of Search...29/156.8 T; 156.8 H, 156.8 R; 416/97, 96 A, 224, 96

[56] References Cited
UNITED STATES PATENTS

| | | | |
|---|---|---|---|
| 1,905,944 | 4/1933 | Lorenzen | 39/156.8 T |
| 1,908,074 | 5/1933 | Squires | 29/156.8 T |
| 2,779,565 | 1/1957 | Bruckmann | 416/96 A |
| 3,301,527 | 1/1967 | Kercher | 416/96 A |
| 3,446,480 | 5/1969 | Emmerson et al. | 416/96 A |
| 3,627,443 | 12/1971 | Pirzer | 416/96 |
| 3,697,192 | 10/1972 | Hayes | 416/97 |

Primary Examiner—C. W. Lanham
Assistant Examiner—Dan C. Crane
Attorney, Agent, or Firm—Charles M. Hogan; Irwin P. Garfinkle

[57] ABSTRACT

A method is described for making inserts used in air-cooled turbine blades. A length of tubing is first selectively reduced in wall thickness to form a thick walled lower portion. This tubular element is then collapsed to an air foil shape with the thick walled portions in contiguous relation. An end cap is secured to the outer, thin walled portion of the tubular element. Lower corner portions of the collapsed tube are cut away to form cooling air entrances. A hole is formed in the collapsed thick walled portions to receive a pin which retains the insert on the turbine blade. Impingement air discharge holes are drilled in the thin walled portion of the insert thus formed.

5 Claims, 5 Drawing Figures

Patented Jan. 7, 1975 3,858,290

METHOD OF MAKING INSERTS FOR COOLED TURBINE BLADES

The present invention relates to improvements in air cooling of blades for the turbines of gas turbine engines and more particularly to improved methods for forming blade inserts utilized in certain types of cooling systems for such blades.

Recently filed application, Ser. No. 302,421 filed Oct. 31, 1972 and of common assignment, describes an improved air cooled turbine blade which incorporates, in a homogeneous blade structure, an insert providing impingement cooling of the blade. Generally speaking, this insert is in the form of a thin walled, air foil shaped shell which is disposed within a chamber defined by the main body portion of the blade. The insert is provided with a thickened lower end portion which is secured to the outer portion of the tang of the blade by a pin or rivet. Cooling air passes through openings adjacent to the lower end of the blade insert and then is discharged from apertures in the thin walled portion of the insert to impinge against and cool the chamber defining walls of the blade which also define the air foil portion of the blade that is subject to the intense temperatures of the hot gas stream.

While not necessarily so limited in its broader aspects, the primary object of the present invention is to provide an economical method for forming blade inserts particularly adapted for incorporation in the novel blade structure disclosed in the above referenced application.

Another object of the present invention is to provide a novel, economical method for fabricating blade inserts for air cooled turbine blades.

These ends are attained by forming a tubular element having a relatively thin walled, upper portion and a relatively thick walled lower portion. This tube is then collapsed to form an air foil configuration. The collapsing step may be facilitated by inserting a supporting element within the tube, such as a length of wax, or the like, and the collapsing may be performed by pressing dies against opposed walls of the tube.

After collapsing, retainer receiving surface means are then formed through the thick walled lower portion of the tube as preferably done by forming a hole therethrough transversly of the air foil section.

A separate cap portion may be secured to the outer portion of the collapsed tube to define the outer end of the insert chamber when it is assembled in the blade. Further, the thickened portions of the collapsed, tubular element may be partially cut away to provide an opening or passageway for the introduction of cooling air into the upper end of the insert when it is assembled in the turbine blade.

The above and other related features of the invention will be apparent from a reading of the following description of a preferred embodiment and the novelty thereof pointed out in the appended claims.

Figure 1:
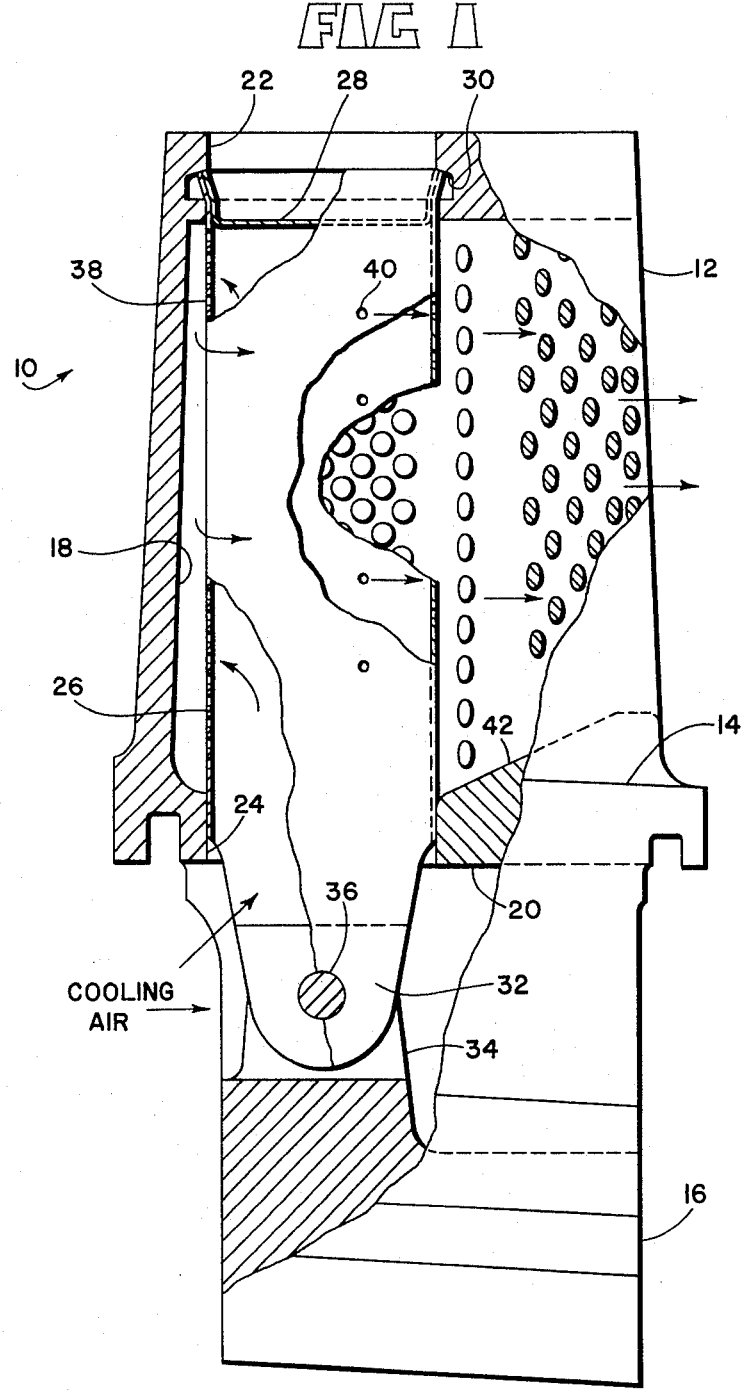
FIG. 1 is a view, with portions broken away and others in section, of a turbine blade incorporating an insert fabricated in accordance with the present invention.

Referencing first FIG. 1, a turbine blade 10 will be described. The blade 10 comprises an aerodynamic air foil section 12 projecting outwardly from a platform 14 and an inwardly projecting tang 16, all of which are integrally formed as a structural element as from a casting or the like. These elements of the blade are well known. The air foil section 12 is the working element of the blade projecting into the hot gas stream. The platform 14, in combination with platforms of other blades, defines the inner bound of the hot gas stream flow path. The tang 16 provides for attachment of the blade on the turbine rotor disc.

The air foil 12 is formed as a thin walled, hollow shell defining an interior cavity or chamber 18. A passageway 20 extends through and across the upper portion of the tang 16 below the platform 14. Aligned openings 22 and 24 extend respectively from the tip end of the air foil 12 into the chamber 18 and from the chamber 18 into the tang passageway 20.

A thin walled insert 26 is disposed within the chamber 18. Its upper end sealingly engages the inner portion of the passageway 22 while its lower end extends through and sealingly engages the passageway 24. The outer portion of the insert 26 is provided with an end cap 28, and flanged portions of which, alson with the outer portions of the insert 26, are bent into and captured by a groove 30 formed around the passageway 22. The lower end portion of the insert 28 comprises a thickened portion 32 which is disposed within a slotted lug 34 projecting into the tang passageway 20. A pin 36, or the like, projects through aligned openings in the lug 34 and the thickened lower portion 32 of the insert 36 to provide the primary means for retaining the insert of the blade.

Cooling air enters the passageway 20 as indicated by the legend in FIG. 1 and in a fashion more fully explained in the above referenced application. This cooling air passes, as indicated by the arrows, into the interior of the insert and is then discharged through holes formed in its thin walled portion to impinge against the inner surface of the thin walled shell which defines the cavity 18. More specifically, there is a series of holes 38 formed along the leading edge of the insert which impinge cooling air against the leading edge portion of the air foil. There are further holes 40 formed in the lateral sides of the insert which provide further impingement cooling against the pressure and suction portions of the air foil. The cooling air discharged from the insert then passes through a lengthwise extending slot 42 for discharge from the trailing edge of the air foil section.

Further description of the turbine blade itself may be obtained from the previously referenced application, if desired.

With reference to FIGS. 2–5, a description will now be provided of the novel method by which the above described insert 26 is formed. To give further prospective to the following description, it will be pointed out that the overall height of the insert 26 may be quite small in the order of one inch. Similarly, the thin walled portion of the insert may be in the order of 0.008 inch and the thickness of the lower end of the insert may approximate 0.060 inch. These small dimensions create difficulties in employing normal fabrication techniques.

Figure 2:
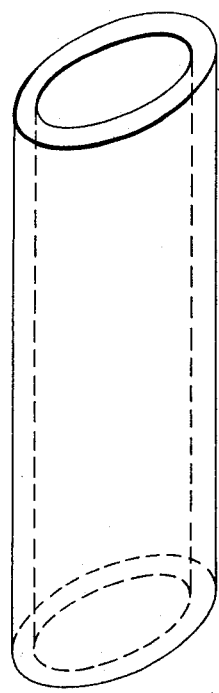
FIGS. 2, 3, 4 and 5 are prospective views illustrating the progressive steps employed in fabricating the turbine blade insert.

The preferred starting point for the present invention is a length of tubing $t$ as illustrated in FIG. 2. The length of the tube $t$ approximates the desired final length or heighth of the insert 26. The wall thickness of the tube approximates one half the thickness of the air foil shape of the finished insert 26.

The tube $t$ is then machined, either mechanically or electrochemically, or in other appropriate fashion, to thin its upper portion to a wall thickness equalling the desired wall thickness of the upper portion of the insert 26. This is indicated by the configuration of the modified tube $t'$, illustrated in FIG. 3. It will also be noted that the upper thin walled portion blends, through a radius $r$, into the lower thickened portion of the tube $t'$. The thick walled portion and the thin walled portion thereof are thus integrally formed to provide maximum strength. However, within the broader aspects of the invention, the tube $t'$ could be formed in other ways.

Figure 3:
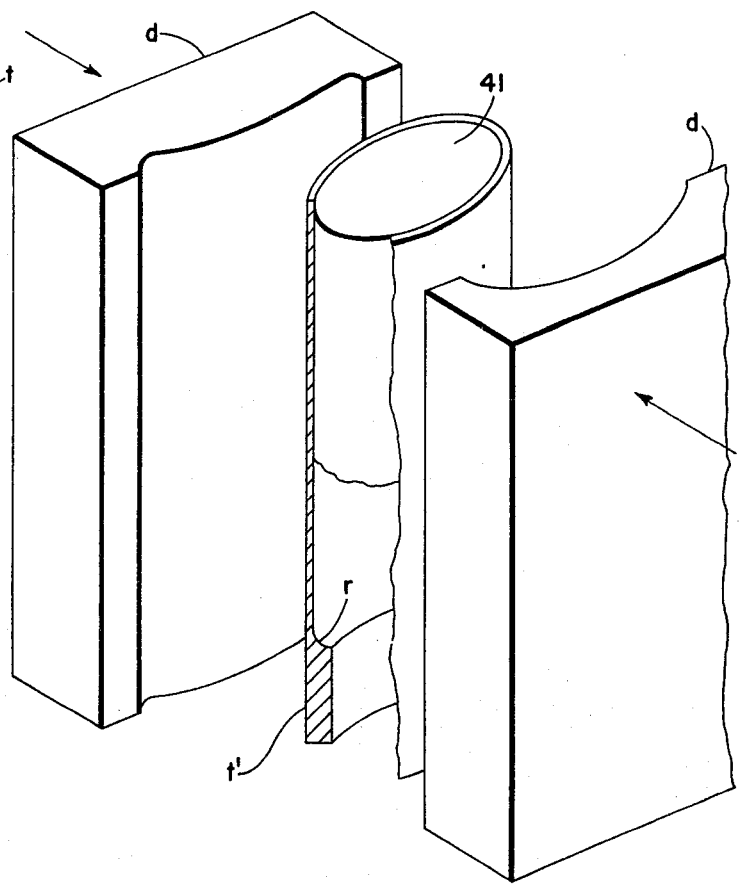

The modified tube $t'$ is then collapsed by dies $d$ which are forced toward each other by appropriate pressure means with the tube $t'$ disposed therebetween. During the collapsing operation, it is preferable that the tube $t'$ be filled with some flowable, resistance material to distribute pressure loadings and prevent undesired buckling of the tube walls. By way of example, the tube $t'$ is illustrated in FIG. 3 with a core 41 of hard wax. The collapsing operation may be carried out in one or a series of steps, dependent upon the material from which the tube is formed as well as the thinness of the desired air foil end shape. Where progressive deformation of the tube is employed, it is also preferable to anneal the tube between each collapsing operation. Further, it may be desirable to impart a twist to the insert to correspond to whatever twist is found in the blade for which it is being fabricated.

Figure 4:
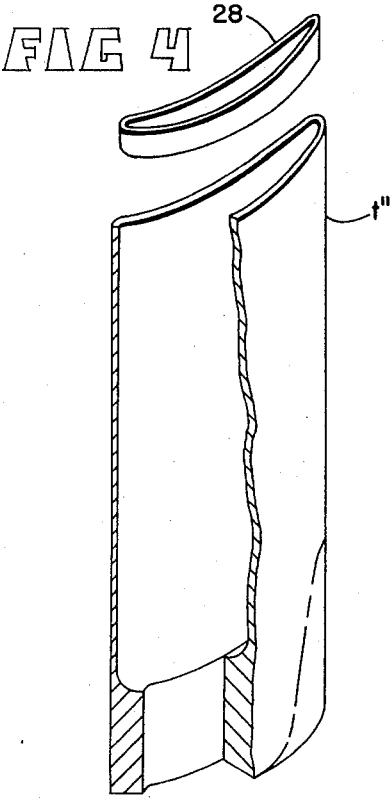

After the tube $t'$ has been collapsed to its final air foil shape and the wax removed by appropriate means, as indicated by the tubular element $t''$ in FIG. 4, the lower, thickened portions of the tube are in substantially contiguous relationship. Where the outer or tip end of the insert is to be provided with a closure, a flanged cap, previously identified by reference character 28, is telescoped into the outer end of the tube $t''$. The cap 28 comprises an outwardly projecting flange which is welded or otherwise secured to the marginal outer portions of the thinned walled tip section of the tube $t''$.

Figure 5:
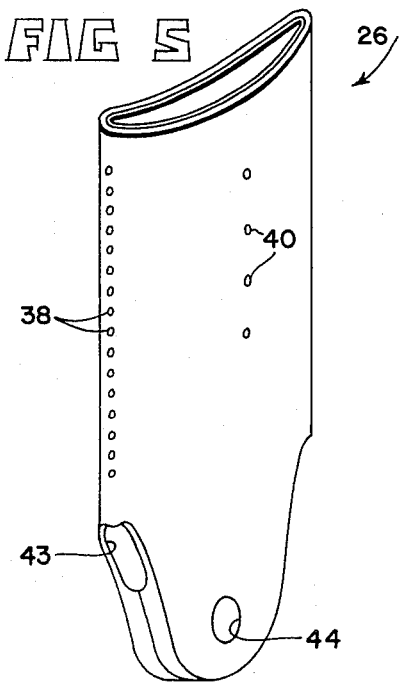

Additional steps in the manufacture of the insert 26 include cutting away portions of the lower end of the tube $t''$, as indicated by the phantom line in FIG. 4, and the cut away sections of FIG. 5. By thus cutting away the leading and trailing portions of the air foil section, openings or passageways 43 are formed in the insert for introduction of cooling air into the insert when it is assembled with the previously described blade.

Further, a hole 44 is drilled or otherwise machined in the collapsed, thick walled portions of the tube $t''$ to receive the pin 36 which retains the insert on the blade, as above referenced.

Also, the holes 38 and 40 are drilled through the thin walled section of the blade by appropriate means which could include electro-chemical discharge machining or the use of a laser beam.

The insert 26 is thus formed as a structurally sound member in a highly economic fashion.

While a preferred embodiment of the invention has been described insofar as the method steps to be followed therein, it will be understood that variations thereof will occur to those skilled in the art. Therefor, the spirit and scope of the present inventive concepts is to be derived solely from the following claims:

Having thus described the invention, what is claimed is novel and desired to be secured by Letters Patent of the United States is:

1. The method of forming a thin walled insert for incorporation in an air cooled hollow turbine blade, said blade comprising an integral air foil projecting from a tang for mounting said blade to a rotor, comprising the steps of selectively removing material from the inner diameter of the upper portion of a length of tubing to define a desired wall thinness in the upper portion and a relatively thick portion at the lower end thereof collapsing said tubular element to an air foil configuration by pressure exerted normal to the axis of the tube wherein the interior of said thick walled portions are in closely spaced contiguous relationship and said thin walled upper portions are spaced, said thin walled upper portion generally conforming to the interior configuration of a portion of said hollow turbine blade but being dimensioned smaller than said portion, said thick walled portions extending into said tang; and forming a retainer receiving surface through the thick walled lower portion, said retainer receiving surface being connectable to said tang to provide the primary retaining means between said turbine blade and said insert.

2. The method of claim 1 further comprising the step of removing a corner portion of the lower end of the collapsed tube, which corner portion includes both thick walled and thin walled portions thereof to form a cooling air entrance passageway therein.

3. The method of claim 1 further comprising the step of forming small holes in the thin walled portion of the collapsed tube for impingement discharge of cooling air therefrom.

4. The method of claim 3 further comprising the steps of inserting a cap having an outline corresponding to the interior outline of the collapsed tube and an outwardly projecting peripheral flange into the outer end of the collapsed tube and securing said flange to the outer marginal portions of the collapsed tube.

5. The method of claim 4 further comprising the steps of filling said tubular element with a flowable, resistance material before the collapsing step, and wherein the step of forming a retainer receiving surface comprises forming a hole transversely through the thick walled portions of the collapsed tube intermediate its leading and trailing edges, said thick walled portions being connectable to said tang by means of a pin extending through said hole.

* * * * *